(12) United States Patent
Chappaz

(10) Patent No.: US 6,990,142 B2
(45) Date of Patent: Jan. 24, 2006

(54) PROCESS AND DEVICE FOR ESTIMATING THE IMPULSE RESPONSE OF AN INFORMATION TRANSMISSION CHANNEL, IN PARTICULAR FOR A CELLULAR MOBILE TELEPHONE

(75) Inventor: David Chappaz, Geneva (CH)

(73) Assignee: STMicroelectronics N.V., Amsterdam (NL)

( * ) Notice: Subject to any disclaimer, the term of this patent is extended or adjusted under 35 U.S.C. 154(b) by 730 days.

(21) Appl. No.: 09/855,734

(22) Filed: May 15, 2001

(65) Prior Publication Data

US 2002/0012410 A1   Jan. 31, 2002

(30) Foreign Application Priority Data

Jun. 23, 2000 (EP) .................................. 00113060

(51) Int. Cl.
*H04B 17/00* (2006.01)
*H04B 3/46* (2006.01)
*H04Q 1/20* (2006.01)

(52) U.S. Cl. ................... 375/224; 455/67.11; 370/241

(58) Field of Classification Search ................ 375/346, 375/227, 348, 350, 349, 229, 232, 224, 296, 375/285; 455/63, 67, 63.1, 67.11, 67.13, 455/69; 370/241
See application file for complete search history.

(56) References Cited

U.S. PATENT DOCUMENTS

| | | | | |
|---|---|---|---|---|
| 3,659,229 A * | 4/1972 | Milton | ......................... | 333/18 |
| 5,091,918 A * | 2/1992 | Wales | ......................... | 375/229 |
| 5,231,648 A * | 7/1993 | Driedger et al. | ............. | 375/231 |
| 5,465,276 A * | 11/1995 | Larsson et al. | .............. | 375/346 |
| 5,479,446 A * | 12/1995 | Mourot | ........................ | 375/243 |
| 5,715,279 A * | 2/1998 | Laakso et al. | ............... | 375/224 |
| 5,838,739 A * | 11/1998 | Ramesh et al. | .............. | 375/348 |
| 5,889,827 A | 3/1999 | Bottomley et al. | ......... | 375/350 |
| 5,903,610 A * | 5/1999 | Skold et al. | ................. | 375/285 |
| 5,933,768 A * | 8/1999 | Skold et al. | ................. | 455/296 |
| 6,049,577 A * | 4/2000 | Gothe et al. | ................. | 375/368 |
| 6,185,258 B1 * | 2/2001 | Alamouti et al. | ........... | 375/260 |
| 6,269,131 B1 * | 7/2001 | Gothe et al. | ................. | 375/346 |
| 6,611,551 B1 * | 8/2003 | Jones, et al. | ................. | 375/219 |
| 6,775,329 B2 * | 8/2004 | Alamouti et al. | ........... | 375/267 |
| 6,792,052 B1 * | 9/2004 | Johansson | .................... | 375/340 |
| 6,807,240 B2 * | 10/2004 | Alamouti et al. | ........... | 375/341 |
| 6,816,558 B2 * | 11/2004 | Piirainen et al. | ............ | 375/316 |
| 2002/0054650 A1 * | 5/2002 | Alamouti et al. | ........... | 375/295 |
| 2003/0133516 A1 * | 7/2003 | Alamouti et al. | ........... | 375/295 |
| 2003/0219080 A1 * | 11/2003 | Alamouti et al. | ........... | 375/299 |
| 2004/0234003 A1 * | 11/2004 | Alamouti et al. | ........... | 375/267 |

FOREIGN PATENT DOCUMENTS

| WO | 97/44916 | 11/1997 |
|---|---|---|
| WO | 98/40977 | 9/1998 |

* cited by examiner

*Primary Examiner*—Jean B. Corrielus
(74) *Attorney, Agent, or Firm*—Lisa K. Jorgenson; Allen, Dyer, Doppelt, Milbrath & Gilchrist, P.A.

(57) ABSTRACT

A first estimate is made of the impulse response of the channel considered as a whole, then this first estimate is corrected independently of the information transmitted for obtaining a corrected final estimate of the impulse response of the channel. This is done by taking account of the fact that the impulse response of the sender and the impulse response of the receiver are known.

26 Claims, 3 Drawing Sheets

PROCESS AND DEVICE FOR ESTIMATING THE IMPULSE RESPONSE OF AN INFORMATION TRANSMISSION CHANNEL, IN PARTICULAR FOR A CELLULAR MOBILE TELEPHONE

FIELD OF THE INVENTION

The invention relates to the transmission of digital information, and more particularly but not exclusively, within a cellular mobile telephone domain according to the GSM (Global System for Mobile Communication) standard.

The invention relates more particularly to the estimation of the impulse response of a transmission channel conveying information from a sender to a receiver via a means of propagation. The means of propagation may be air for cellular mobile telephones, or any other means of propagation, such as a cable in other applications, for example.

BACKGROUND OF THE INVENTION

A fundamental factor limiting the performance of a digital communication system is the phenomenon known as inter-symbol interference, which is well known by a person skilled in the art. Inter-symbol interference causes at the receiver level temporal occupation of each symbol or bit transmitted, which is longer than the initial duration of the symbol. This is also referred to as the bit time, for example.

Stated otherwise, the signal received at a given instant does not depend on one symbol or bit alone, but also on the other symbols or bits sent, which extends over durations greater than those of one symbol or bit time. In practice, the signal received at a given instant depends on the symbol concerned, and also essentially on adjacent symbols.

The causes of inter-symbol interference are multifold. One of them is due in particular to the multiple propagations of the signal between the sender and the receiver when the signal is reflected or diffracted by various obstacles. This leads to the reception of several signal copies that are mutually shifted temporally. Moreover, this interference between symbols is produced not only by the propagation between the sender and the receiver, but also by the sending/receiving devices themselves, such as the modulator, filter, etc.

During communications with interference between symbols, the problem arises on estimating the impulse response of the transmission channel. The quality of this estimate depends on the capacity to eliminate the interference between symbols, and hence to take corrective action regarding symbols sent.

Generally, the estimate of the impulse response of the channel, or more simply the channel estimate, is performed within the GSM telephone domain by using least squares techniques, and by using a predetermined sequence of symbols which is known to the sender and to the receiver. This is referred to by the term training sequence, which is well known by a person skilled in the art. This training sequence is present within each symbol train or burst sent. When the characteristics of the channel are sufficiently well estimated, the estimated coefficients of the impulse response of the channel are used in an equalization processing operation, also well known by the person skilled in the art. This is done to decipher the signal received. That is to say, the logic values of the symbols or data sent in the train are retrieved.

The equalization processing operation is conventionally followed by the channel decoding processing operations intended for correcting any errors. Channel decoding is followed by another decoding, known as source decoding, which is intended for reconstructing the information (speech, for example) initially coded at the level of the sender.

The article by Khayrallah et al., entitled "Improved Channel Estimation With Side Information" (1997, IEEE) and the corresponding U.S. Pat. No. 5,838,739, discloses a method of channel estimation. This estimation is based on the combined use of training sequences, and of the known characteristics of the sending and receiving means (filters), and includes determining the estimated coefficients of the impulse response of the channel.

However, such a method has drawbacks. One of them resides in the fact that this method depends on the information transmitted, namely the training sequences, which may be different depending on the systems used. Consequently, it is necessary to store in the portable telephone, for example, as many matrices as there are different possible training sequences. Another drawback resides in the fact that such a method is not applicable to so-called blind channel estimates, that is to say, when training sequences are not available.

SUMMARY OF THE INVENTION

In view of the foregoing background, an object of the present invention is to provide an improvement to channel estimation which can be applied equally well to learned estimates (i.e., those with training sequences) and blind estimates (i.e., those with no training sequences).

Another object of the present invention to provide an improvement of this kind which is extremely straightforward to implement.

The invention therefore provides a process for estimating the impulse response of an information transmission channel comprising an information sender, an information receiver and a means of propagation, such as air, for example, extending between the sender and the receiver.

According to a general characteristic of the invention, a first estimate is made of the impulse response of the channel considered as a whole, then this first estimate is corrected, independently of the information transmitted, by taking account of the fact that the impulse response of the sender and the impulse response of the receiver are known. This is done to obtain a corrected final estimate of the impulse response of the channel.

Stated otherwise, the invention proceeds in two phases. First, the channel is estimated as a whole, including the channel that is in association with the sender, the receiver and the means of propagation, but without taking account the fact that the impulse response of the sender and of the receiver are known. Stated otherwise, this first estimate is made in a conventional manner, by any known method, such as learned or blind. Next, in a second phase, this first estimate is corrected by employing the known elements, namely the impulse responses of the sender and of the receiver.

Apart from the fact that the process according to the invention is perfectly compatible with blind or learned channel estimates, it is, with regards to the correction phase, totally independent of the data sent. This is so since it involves only the intrinsic and known characteristics of the sending and receiving means, such as the modulators, demodulators and various filters, for example.

According to one mode of implementation of the process according to the invention, the coefficients of the final estimate of the impulse response of the channel are obtained by multiplying the coefficients of the first estimate of the impulse response of the channel by a matrix whose coefficients are predetermined and representative of the impulse responses of the sender and of the receiver, and are independent of the information transmitted on the channel.

Thus, the invention is noteworthy in the sense that it requires the storage of just a single transformation matrix, whose coefficients in particular are independent of the data transmitted, and consequently independent of the training sequences where these exist.

Another aspect of the invention is directed to a device for estimating the impulse response of an information transmission channel comprising an information sender, an information receiver and a means of propagation extending between the sender and the receiver.

According to a general characteristic of the invention, the device comprises first estimation means able to make a first estimate of the impulse response of the channel considered as a whole, and second estimation means connected to the first estimation means for correcting this first estimate, independently of the information transmitted for delivering a corrected final estimate of the impulse response of the channel. This is done by taking account of the fact that the impulse response of the sender and the impulse response of the receiver are known.

According to one embodiment of the invention, the second estimation means comprises a memory containing a matrix whose coefficients are predetermined and representative of the impulse responses of the sender and of the receiver, and are independent of the information transmitted on the channel. The second estimation means also comprises processing means able to multiply the coefficients of the first estimate of the impulse response of the channel by the matrix to obtain the coefficients of the final estimate of the impulse response of the channel. The first estimation means are able to make a first blind estimate, or else a first learned estimate.

Another aspect of the invention is directed to a cellular mobile telephone incorporating a device for estimating the impulse response of an information transmission channel as defined above.

Yet another aspect of the invention provides a computer program comprising program-code means implementing the estimation process, as defined above, when the program is executed within a processor.

The invention further provides a storage device, for example, a read-only memory, capable of being read by a processor, and containing program-code means able to implement the estimation process as defined above when the program is executed within the processor.

BRIEF DESCRIPTION OF THE DRAWINGS

Other advantages and characteristics of the invention will become apparent on examining the detailed description of embodiments and modes of implementation that are in no way limiting, and the appended drawings, in which.

DETAILED DESCRIPTION OF THE PREFERRED EMBODIMENTS

Figure 1:
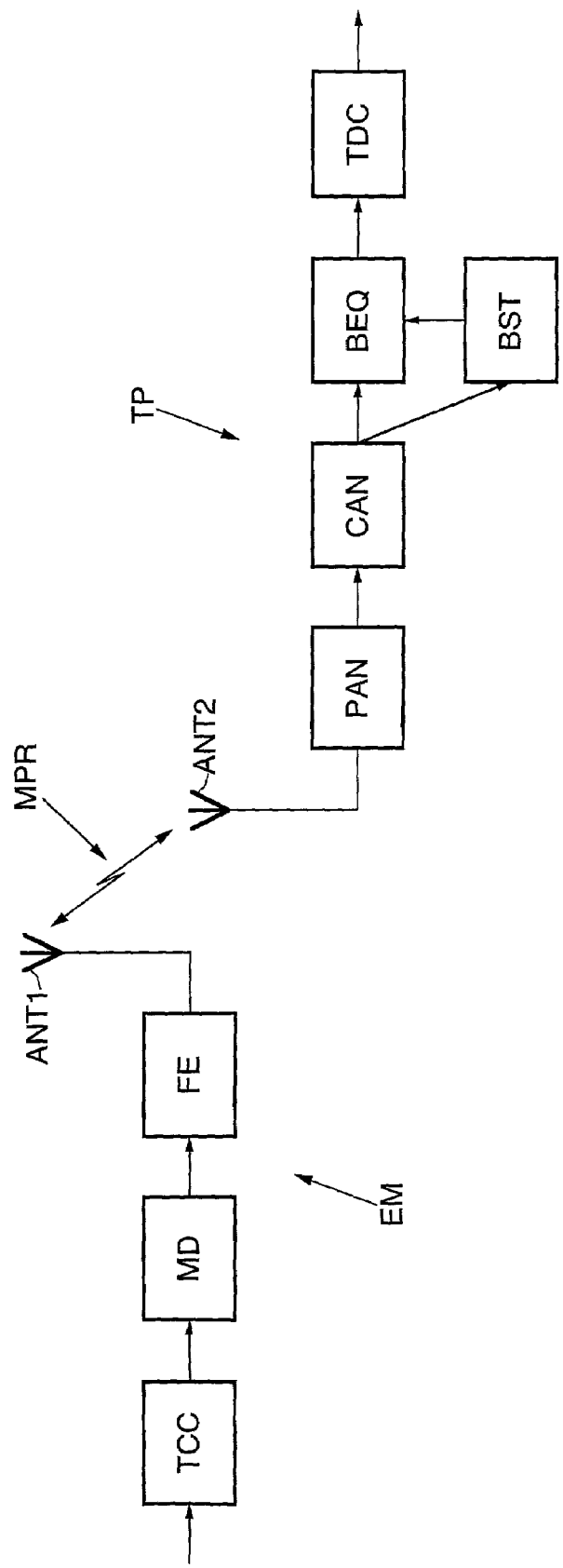
FIG. 1 is a block diagram illustrating the basic parts of a sender and of a receiver for implementation of the process according to the present invention.

It is now assumed, referring more particularly to FIG. 1, that the invention is applied to the domain of cellular mobile telephones, for example, such as those of the GSM network, for example. In FIG. 1, the reference EM designates a sender or transmitter comprising upstream a coding block TCC for receiving the useful data to be transmitted, such as speech for example, and performing in particular channel coding conventional processing for introducing redundancies into the data stream. The output from the TCC block includes binary information blocks.

The TCC block is conventionally followed by a modulator performing, for example, a quadrature modulation of the QPSK or 8PSK type, according to terminology well known to a person skilled in the art, and transforming the binary signal into an analog signal. This analog signal is then filtered in a send filter FE before being sent towards the receiver via an antenna ANT1. The means of propagation MPR between a sender EM and a receiver TP, here including a cellular mobile telephone, is air in the present case.

The receiver TP, or cellular mobile telephone, comprises at the front end an antenna ANT2 coupled to an analog stage PAN, carrying out a frequency conversion to bring the modulated signal received into the baseband, and a filtering to retain only the useful part of the spectrum. After sampling and analog/digital conversion in a converter CAN, the role of the digital stage is to produce an estimate of the transmission channel. This is done in block BST, wherein a more detailed structure is provided in FIG. 2 which will be described below. This is done to eliminate the inter-symbol interference by virtue of this estimate, i.e., by an equalization performed in a block BEQ, and in general, to perform error correction. This includes conventional channel decoding (block TDC) based, for example, on a Viterbi decoder, etc.

Within the meaning of the present invention, the transmission channel is formed by the elements situated upstream of the channel estimator. In particular, this includes the analog sending and receiving devices as well as the physical means of propagation MPR. It should be noted here that it is also possible to find and to take into account digital processing operations (filtering, for example) performed upstream of the channel estimator but downstream of the analog reception stage.

Figure 3:
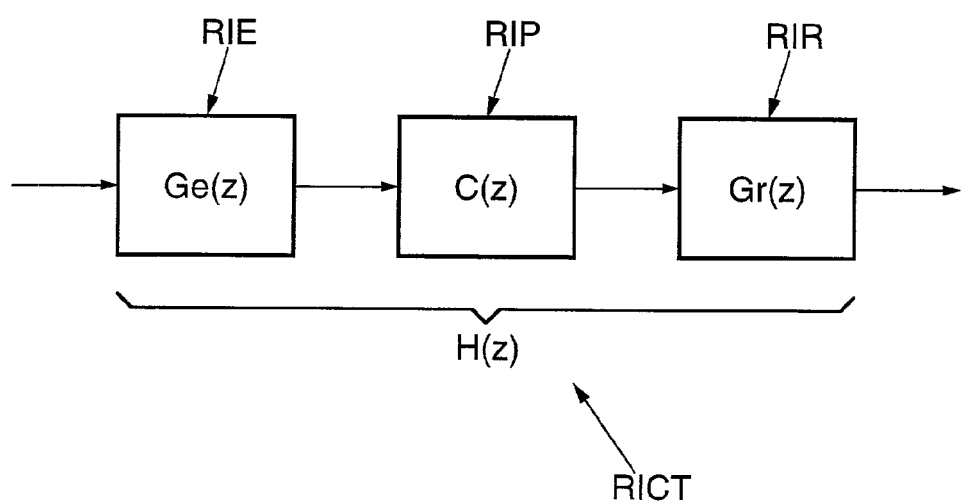
FIG. 3 is a block diagram illustrating the components of the impulse response of a transmission channel according to the present invention.

The model or impulse response H(z) of the transmission channel to be estimated is illustrated diagrammatically in FIG. 3. The channel impulse response RICT is in fact the product of the impulse response RIE of the sender, of the impulse response RIP of the means of propagation, and of the impulse response RIR of the receiver.

More precisely, H(z) is defined by formula (I) below:

$$H(z)=G_e(z)*C(z)*G_r(z) \qquad (I)$$

or, more simply, H(z) is equal to:

$$H(z)=G(z)*C(z) \qquad (II)$$

in which G(z) represents the impulse response of the sending and receiving devices, and C(z) is the impulse response of the physical means of propagation.

In the present case, G(z) and C(z) are polynomials in $z^{-1}$. The number of complex coefficients is predetermined and depends in particular on the characteristics of the sending and receiving devices, and also on the signal propagation environment (hilly, urban or other path). The number of complex coefficients is generally based on a worst case. Thus, from a propagation point of view, the mountainous environment is effectively a worst case as compared with the urban or rural environment, for example.

It is assumed, by way of example, that the impulse response H of the transmission channel taken as a whole is a polynomial in $z^{-1}$ of degree 7 with eight complex coefficients $h_0$–$h_7$, which we seek to estimate. H(z) is therefore defined by formula (III) below:

$$H(z)=h_0+h_1z^{-1}+\ldots+h_7z^{-7} \qquad \text{(III)}$$

Figure 4:
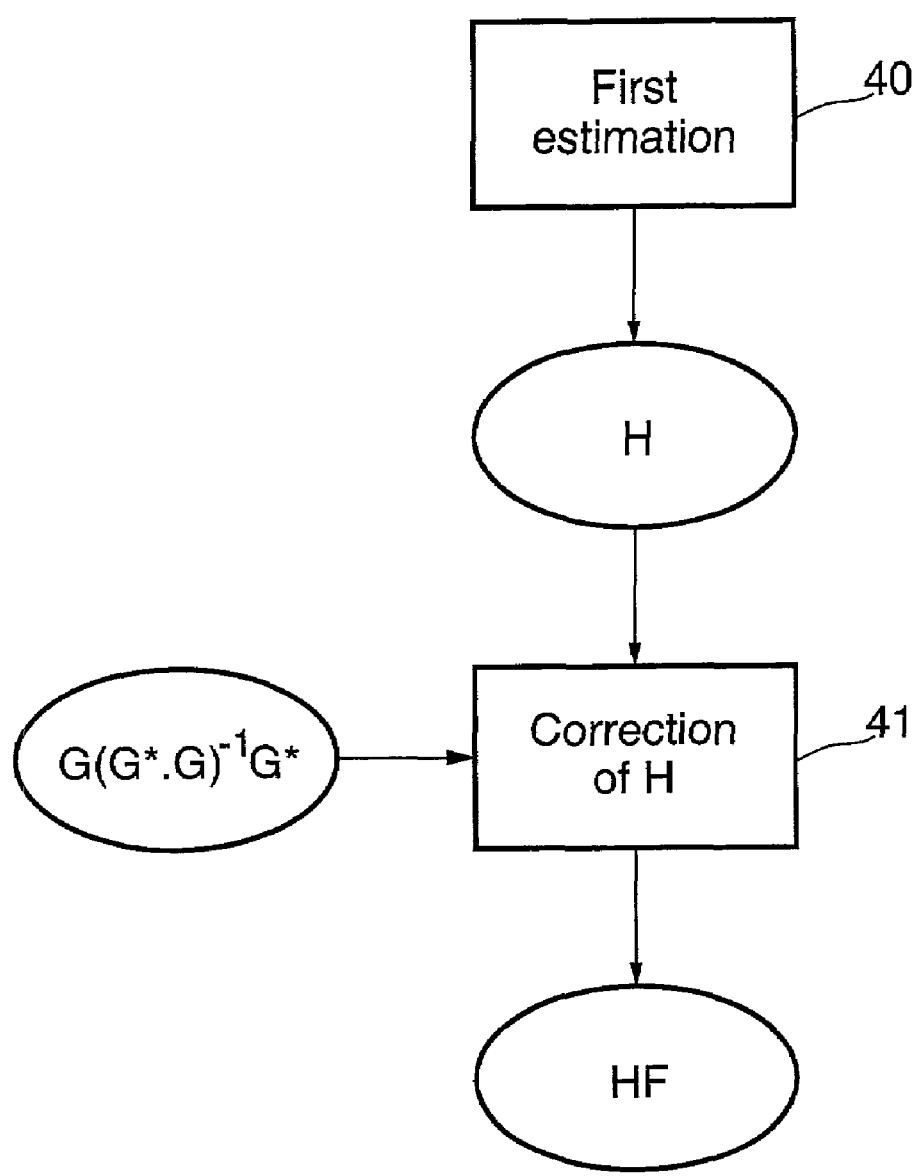
FIG. 4 is a simplified flowchart of a mode of implementation of the process according to the present invention.

A first estimate 40 of the coefficients $h_0$–$h_7$ is first made (FIG. 4). This first estimate is made in a conventional manner. More precisely, if this first estimate is a learned estimate, that is to say, one which uses training sequences formed of a succession of bits of known value, each received signal sequence R is defined by the matrix formula (IV) below:

$$R=S*H+N \qquad \text{(IV)}$$

in which S designates the matrix representative of the training sequence, H represents the vector formed of the coefficients $h_0$–$h_7$ and N an additional vector representative, in particular, of interference and of thermal noise.

A conventional way of solving this system, that is to say, of estimating the coefficient $h_i$ of the impulse response H of the channel taken as a whole, includes using a least squares method which determines H as being the vector which minimizes the (Euclidean) norm of the vector N. The person skilled in the art is then aware that the vector H is defined by the formula (V) below:

$$H=(S*S)^{-1}S*R \qquad \text{(V)}$$

in which the notation "*" designates the transposed complex conjugate matrix.

Of course, other methods are also usable to estimate the coefficients $h_i$ of the impulse response of the channel taken as a whole. These other methods are also well known to the person skilled in the art and they will not be discussed in further detail here.

It is also possible to use so-called blind estimates, that is to say, ones in which no predetermined training sequences are used. The person skilled in the art is also aware of various methods making it possible to perform blind estimations of the impulse response H of a channel taken as a whole. By way of indication, we may cite the article by Jitendra K. Tugnait, entitled "Blind Estimation Of Digital Communication Channel Impulse Response", IEEE Transactions On Communications, Vol. 42, No. 2/3/4, February/March/April 1994.

Figure 2:
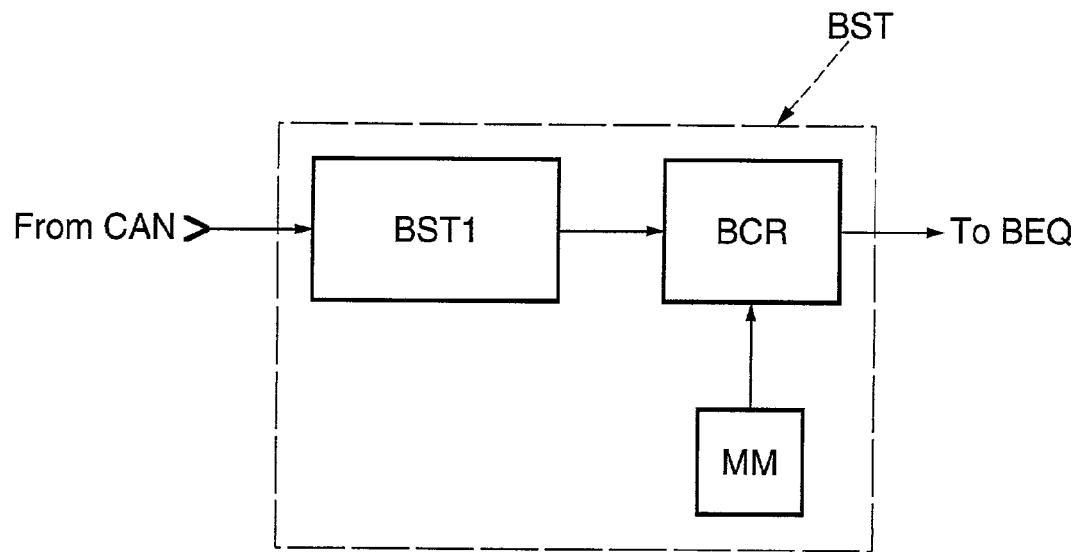
FIG. 2 is a block diagram illustrating in greater detail part of the receiver illustrated in FIG. 1.

The channel estimate is made in a block BST (FIG. 2). More precisely, the first estimate is made in a subblock BST1 of the block BST. The entire block BST may be embodied in hardware, for example, as a signal processing processor, with the processing operations performed in the block BST1 being carried out in software. These processing operations are therefore in the form of program codes which can easily be written by the person skilled in the art on the basis of the functional definition of these processing operations. The program-code is then, for example, stored in a read-only memory associated with the processor. Consequently, an entirely hardware embodiment of the block BST is also possible, for example, in the form of an application specific integrated circuit (ASIC).

Once this first estimate has been obtained, it will be corrected in a block BCR, which is also functionally embodied in software within the signal processing processor. It is again assumed by way of example that the impulse response C of the physical propagation means is a polynomial with five complex coefficients of degree 4, defined according to formula (VI) below:

$$C(z)=c_0+c_1z^{-1}+c_2z^{-2}+c_3z^{-3}+c_4z^{-4} \qquad \text{(VI)}$$

Likewise, it is assumed by way of example that the impulse response G of the sending and receiving devices is a polynomial of degree 3 with four complex coefficients, defined by formula (VII) below:

$$G(z)=g_0+g_1z^{-1}+g_2z^{-2}+g_3z^{-3} \qquad \text{(VII)}$$

The convolution product (polynomial product) H(z)=G(z)*C(z) is then represented in matrix fashion by the equation H=G*C, in which H is the column vector formed of the coefficients $h_i$, C is the column vector formed of the coefficients $c_i$, and G is the matrix (here an 8×5 matrix) defined by formula (VIII) below:

$$G = \begin{pmatrix} g_0 & 0 & 0 & 0 & 0 \\ g_1 & g_0 & 0 & 0 & 0 \\ g_2 & g_1 & g_0 & 0 & 0 \\ g_3 & g_2 & g_1 & g_0 & 0 \\ 0 & g_3 & g_2 & g_1 & g_0 \\ 0 & 0 & g_3 & g_2 & g_1 \\ 0 & 0 & 0 & g_3 & g_2 \\ 0 & 0 & 0 & 0 & g_3 \end{pmatrix} \qquad \text{(VIII)}$$

More generally, since the impulse response H(z) is a linear combination of G(z) and its delayed versions, the number of columns of the matrix G is equal to the number of coefficients of the impulse response C(z). Each column of the matrix G comprises the coefficients $g_i$ supplemented with 0s. The coefficients of a column are shifted by one row with respect to the coefficients of the previous column.

The corrected final estimated impulse response of the channel, referenced HF, must then be written according to formula (IX):

$$HF=GC \qquad \text{(IX)}$$

and must also be as close as possible to the impulse response H. Stated otherwise, HF must minimize the criterion defined by formula (X) below:

$$\|HF-H\|^2 \qquad \text{(X)}$$

It can then be shown that the estimated final impulse response of the channel is defined by formula (XI) below:

$$HF = \underbrace{G(G*G)^{-1}G*}_{M}H \qquad \text{(XI)}$$

The predetermined matrix M in the present case is a matrix of size 8×8 whose coefficients take account only of the coefficients $g_i$ and are independent of the data transmitted. This matrix M is stored in a memory MM of the block BST. The block BCR therefore performs a correction 41 (FIG. 4) of the coefficients $h_i$ of the impulse response H of the channel. This is done to deliver the coefficients $hf_i$ of the corrected impulse response HF of the channel. It is these coefficients hf which will be used in the equalization block BEQ of the telephone TP (FIG. 1).

The equalization block will solve the equation defined by the matrix formula (XII) below:

$$R = b*HF + N \quad \text{(XII)}$$

in which R designates the vector representative of the sequence of bits received, b designates the vector representative of the useful bits of the pulse train to be decoded, and HF designates the convolution matrix in which each column comprises the coefficients $hf_i$ supplemented with 0s. The coefficients of a column are shifted by one row with respect to the coefficients of the previous column, and N designates the noise vector. The manner of solving this equation (equalization) is well known to the person skilled in the art. In this regard, there are numerous equalization algorithms.

Among these equalization processing operations, two major classes may be considered. A first class is those which carry out detection symbol by symbol, such as for example, the algorithm known to the person skilled in the art by the term DFE (Decision Feedback Equalization) and whose essential aspects are, for example, described in the work by John G. Proakis, entitled "Digital Communications", third edition, McGraw-Hill, Inc.

A second class is those which carry out the detection of a sequence of symbols, such as for example, the algorithm known by the term MLSE (Maximum-Likelihood Sequence Estimation) or that known by the term DFSE (Decision Feedback Sequence Estimation), also well known to the person skilled in the art. These two algorithms have formed the subject of numerous publications. The person skilled in the art will in particular be able to refer, with regards to the MLSE algorithm, to the work by John G. Proakis cited above, and with regards to the DFSE algorithm, to the article by Hans C. Guren and Nils Holte, entitled "Decision Feedback Sequence Estimation for Continuous Phase Modulation on a Linear Multipath Channel", IEEE Transactions on Communications, Vol. 41, No. 2, February 1993.

Symbol by symbol detection algorithms have very low complexity relative to sequence-based detection algorithms, but give inferior performance. This is why equalization algorithms using sequence-based estimation are generally chosen in preference. The bits b thus delivered are then decoded in the channel decoding block TDC. The equalization algorithms and channel decoding algorithms are, for example, also executed by the signal processing processor.

The invention is not limited to the embodiments and modes of implementation described above, but embraces all variations thereof. Thus, in the example described, H is a linear combination of G and of its delayed versions. Of course, however, it is possible to consider half-integer delays, or even finer delays, by using an oversampling of the signal.

Moreover, the estimation device according to the invention can be incorporated not only into a cellular mobile telephone, but also into the reception pathway of a base station or more generally into any digital information receiver.

What is claimed is:

1. A process for estimating an impulse response of a transmission channel defined by a sender, a receiver, and means of propagation extending therebetween, the process comprising:

calculating a first estimate of the impulse response of the transmission channel considered as a whole; and correcting the first estimate independently of information being transmitted based upon an impulse response of the sender and an impulse response of the receiver being known to obtain a corrected final estimate of the impulse response of the transmission channel.

2. A process according to claim 1, wherein correcting the first estimate comprises calculating coefficients of the corrected final estimate by multiplying coefficients of the first estimate by a matrix whose coefficients are predetermined and representative of the impulse responses of the sender and of the receiver and are independent of the information transmitted.

3. A process according to claim 1, wherein calculating the first estimate is performed using a blind estimate.

4. A process according to claim 1, wherein calculating the first estimate is performed using a learned estimate.

5. A process according to claim 1, wherein the calculating and correcting is performed by a digital signal processor.

6. A process according to claim 1, wherein the calculating and correcting is performed via software.

7. A process according to claim 1, wherein the calculating and correcting is performed by a cellular mobile telephone.

8. A process for estimating an impulse response of a transmission channel defined by a sender, a receiver, and a propagation path extending therebetween, the process comprising:

calculating a first estimate of the impulse response of the transmission channel; and correcting the first estimate independently of information being transmitted based upon an impulse response of the sender and an impulse response of the receiver being known to obtain a corrected final estimate of the impulse response of the transmission channel, with correcting the first estimate comprising calculating coefficients of the corrected final estimate by multiplying coefficients of the first estimate by a matrix whose coefficients are predetermined and representative of the impulse responses of the sender and of the receiver.

9. A process according to claim 8, wherein the coefficients of the matrix are independent of the information transmitted.

10. A process according to claim 8, wherein calculating the first estimate is performed using a blind estimate.

11. A process according to claim 8, wherein calculating the first estimate is performed using a learned estimate.

12. A process according to claim 8, wherein the calculating and correcting is performed by a digital signal processor.

13. A process according to claim 8, wherein the calculating and correcting is performed via software.

14. A process according to claim 8, wherein the calculating and correcting is performed by a cellular mobile telephone.

15. A receiver comprising:

a front end portion for receiving information transmitted via a transmission channel defined by said front end portion, a sender and a propagation path extending therebetween; and an impulse response estimation circuit comprising
a first estimation circuit connected to said front end portion for calculating a first estimate of an impulse response of the transmission channel, and
a second estimation circuit connected to said first estimation circuit for correcting the first estimate independently of information being transmitted via the transmission channel based upon an impulse response of the sender and an impulse response of said front end portion being known to obtain a corrected final estimate of the impulse response of the transmission channel.

16. A receiver according to claim 15, wherein said second estimation circuit comprises:
a memory for storing a matrix whose coefficients are predetermined and representative of the impulse responses of the sender and said front end portion, and is independent of the information transmitted; and
circuitry for multiplying coefficients of the first estimate by the matrix for obtaining coefficients of the final estimate.

17. A receiver according to claim 15, wherein said first estimation circuit performs a blind estimate.

18. A receiver according to claim 15, wherein said first estimation circuit performs a learned estimate.

19. A receiver according to claim 15, wherein said first and second estimation circuits are defined within a digital signal processor.

20. A receiver according to claim 15, wherein said front end and said first and second estimation circuits are defined within a cellular mobile telephone.

21. A receiver according to claim 15, wherein the propagation path comprises at least one of free space and an electrical cable.

22. A computer-readable medium having computer-executable instructions for estimating an impulse response of a transmission channel defined by a sender, a receiver, and a propagation path extending therebetween, the computer-executable instructions comprising:
calculating a first estimate of the impulse response of the transmission channel; and
correcting the first estimate independently of information being transmitted based upon an impulse response of the sender and an impulse response of the receiver being known to obtain a corrected final estimate of the impulse response of the transmission channel.

23. A computer-readable medium according to claim 22, wherein correcting the first estimate comprises calculating coefficients of the corrected final estimate by multiplying coefficients of the first estimate by a matrix whose coefficients are predetermined and representative of the impulse responses of the sender and of the receiver and are independent of the information transmitted.

24. A computer-readable medium according to claim 22, wherein calculating the first estimate comprises performing a blind estimate.

25. A computer-readable medium according to claim 22, wherein calculating the first estimate comprises performing a learned estimate.

26. A computer-readable medium according to claim 22, wherein the calculating and correcting is performed by a cellular mobile telephone.

* * * * *